(12) United States Patent
Yamagaki et al.

(10) Patent No.: US 7,679,744 B2
(45) Date of Patent: Mar. 16, 2010

(54) STOKES PARAMETER MEASUREMENT DEVICE AND METHOD

(75) Inventors: Mieko Yamagaki, Tokyo (JP); Yu Mimura, Tokyo (JP); Kazuyou Mizuno, Tokyo (JP); Takeshi Takagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 272 days.

(21) Appl. No.: 11/987,714

(22) Filed: Dec. 4, 2007

(65) Prior Publication Data

US 2009/0273784 A1    Nov. 5, 2009

Related U.S. Application Data

(63) Continuation-in-part of application No. 11/139,777, filed on May 31, 2005, now Pat. No. 7,369,232, which is a continuation-in-part of application No. 10/347,842, filed on Jan. 16, 2003, now Pat. No. 6,909,506.

(30) Foreign Application Priority Data

Jan. 17, 2002  (JP) ............................. 2002-008330
Jul. 10, 2002  (JP) ............................. 2002-201268

(51) Int. Cl.
   *G01J 4/00*    (2006.01)
(52) U.S. Cl. ....................................... 356/364; 356/365
(58) Field of Classification Search ................. 356/364, 356/365, 368
   See application file for complete search history.

(56) References Cited

U.S. PATENT DOCUMENTS

| 5,337,146 | A |  | 8/1994 | Azzam |
| 5,815,270 | A |  | 9/1998 | Lee |
| 5,965,874 | A |  | 10/1999 | Aso et al. |
| 6,154,581 | A | * | 11/2000 | Lu et al. ......................... 385/11 |
| 6,177,995 | B1 | * | 1/2001 | Compain et al. ............. 356/366 |
| 6,517,479 | B1 |  | 2/2003 | Sekiya et al. |
| 6,671,045 | B1 |  | 12/2003 | Lee et al. |
| 2003/0075676 | A1 |  | 4/2003 | Ruchet et al. |

FOREIGN PATENT DOCUMENTS

| JP | 05-264230 | 10/1993 |
| JP | 06-18332 | 1/1994 |
| JP | 08-220449 | 8/1996 |
| JP | 09-72787 | 3/1997 |
| JP | 11-119009 | 4/1999 |

\* cited by examiner

*Primary Examiner*—Roy Punnoose
(74) *Attorney, Agent, or Firm*—Oblon, Spivak, McClelland, Maier & Neustadt, L.L.P.

(57) ABSTRACT

The invention provides a Stokes parameter measurement device and Stokes parameter measurement method that enable high-precision measurement. The Stokes parameter measurement device comprises a polarization splitting device which comprises an optical element formed of a birefringent crystal material and which, by means of the optical element, splits signal light to be measured into a plurality of polarized light beams and adjusts the polarization state of one or more among the plurality of polarized light beams, and a light-receiving portion for performing photoelectric conversion of an optical component of the signal light split by and emitted from the polarization splitting device.

12 Claims, 8 Drawing Sheets

STOKES PARAMETER MEASUREMENT DEVICE AND METHOD

FIELD OF THE INVENTION

The present invention relates to a Stokes parameter measurement device and a Stokes parameter measurement method for measuring the polarization state of signal light or the like.

DESCRIPTION OF THE BACKGROUND ART

Stokes parameters are parameters that represent a state of polarization. When measuring Stokes parameters, incident signal light is split into four rays using splitting means such as a beam splitter, a half-mirror, or a filter; herein, each of the signal light rays is given a different polarization and phase by means of a phase element, a polarizing element or the like, then the optical components of each of the split signal light rays are subjected to photoelectric conversion by a light-receiving element, and operations are performed on the electrical components obtained by photoelectric conversion, to obtain the Stokes parameters (see Japanese Patent Application Publication No. 6-18332). There are also methods in which, instead of a splitting means comprising a beam splitter or the like, there is used a quadrangular pyramidal prism or the like for concurrent four-beam splitting (see Japanese Patent Application Publication No. 2004-93549).

PROBLEMS TO BE SOLVED BY THE INVENTION

In such a conventional Stokes parameter measurement device, in which incident light is split using a beam splitter, half-mirror or the like, incident light is split by interference, which gives rise to PDL (polarization-dependent loss), thereby making it difficult to achieve high-precision measurement of Stokes parameters. In order to solve these problems, methods have been invented in which light is split using a quadrangular pyramidal prism. In such a method, however, the splitting ratio fluctuates unless the beam position of the light matches precisely the apex of the prism. Thus, when the positional relationship between the beam and the prism apex is offset due to temperature changes, the measurement precision of the Stokes parameters becomes impaired, which is problematic. Moreover, there may also occur optical losses at the edge portions in the boundaries between prism surfaces.

SUMMARY OF THE INVENTION

In light of the above, it is an object of the present invention to provide a Stokes parameter measurement device and Stokes parameter measurement method that enable high-precision measurement.

With a view to solving the above problems and achieving the above goal, the Stokes parameter measurement device according to the present invention comprises (a) a polarization splitting device which comprises an optical element formed of a birefringent crystal material and which, by means of the optical element, splits signal light to be measured into a plurality of polarized light beams and adjusts the polarization state of one or more among the plurality of polarized light beams; and (b) a light-receiving portion for performing photoelectric conversion of an optical component of the signal light split by and emitted from the polarization splitting device.

In the present invention, a polarization splitting device, comprising an optical element formed of a birefringent crystal material, splits signal light to be measured into a plurality of polarized light beams, and adjusts the polarization state of one or more among the plurality of polarized light beams, by means of the optical element. As a result, the splitting ratio can be adjusted by the optical element formed of a birefringent crystal material, while a plurality of linearly polarized components can be obtained directly. Herein it is not necessary to adjust the splitting ratio, since the splitting ratio in the optical element formed of a birefringent crystal material is unique to the optical element, and is little influenced by the arrangement or the like thereof. By using a polarization splitting device comprising an optical element formed of a birefringent crystal material, the present invention allows suppressing PDL, while inhibiting substantial temperature fluctuations, obtaining optical components corresponding to the Stokes parameters with little optical loss, and realizing a Stokes parameter measurement device in which the splitting ratio has little wavelength dependence. In consequence, this allows realizing s Stokes parameter measurement device that enables high-precision measurement.

In the Stokes parameter measurement device according to the present invention, the polarization splitting device in the above invention comprises (b1) a first splitting portion for splitting signal light to be measured into polarized light of a first direction and polarized light of a second direction, by means of a birefringent prism; (b2) a second splitting portion for, by means of a plurality of birefringent prisms, generating a first group of polarized light beams corresponding to the first direction and a second group of polarized light beams corresponding to the second direction perpendicular to the first direction, by further splitting the polarized light split by the first splitting portion through two steps or stages, and for combining at least one polarized light beam of the first group with at least one polarized light beam of the second group, by a predetermined combination; and (b3) a polarization adjustment portion for adjusting the polarization state of one or more among the light beams combined by the second splitting portion.

In such an invention, optical components of signal light are obtained from polarized light beams split by the first splitting portion having a birefringent prism and the second splitting portion having a plurality of birefringent prisms, and hence the splitting ratio can be adjusted by setting the optical axes of the birefringent prisms, while a plurality of linearly polarized components can be obtained directly. Herein it is not necessary to adjust the splitting ratio in the first splitting portion and/or the second splitting portion, since the splitting ratio is determined by the configuration of the birefringent prisms of the first and second splitting portions. The occurrence of substantial temperature fluctuations can be suppressed since the temperature fluctuation of the splitting ratio in the first splitting portion and the second splitting portion is determined by the temperature fluctuation of the extinction ratio of the birefringent crystals. Moreover, using birefringent crystals having a high extinction ratio allows obtaining polarized components such that losses involve only losses by birefringent crystals having AR-coated surfaces. This allows hence obtaining, with little optical loss, optical components corresponding to the Stokes parameters. Also, the wavelength dependence of the splitting ratio is small since light is split using birefringent crystals. This allows realizing a Stokes parameter measurement device for a wide wavelength range.

In the Stokes parameter measurement device according to the present invention, the polarization adjustment portion in the above invention has a wavelength plate for carrying out predetermined phase adjustment on first combined light in which a first polarized light beam among the first group is combined with a first polarized light beam among the second group; a first polarizer for extracting a predetermined polarized component from the first combined light passing through the wavelength plate; and a second polarizer for extracting a predetermined polarized component from second combined light in which a second polarized light beam among the first group is combined with a second polarized light beam among the second group. In such an invention, a circularly polarized component can be obtained through a wavelength plate and a polarizer, while a polarized component in a direction oblique relative to the first and second directions can be obtained through the polarizer.

In the Stokes parameter measurement device according to the present invention, the wavelength plate in the above invention is a ¼ wavelength plate, and a circularly polarized component when either linearly polarized light in the first direction or the second direction is taken as a reference is generated by the first combined light passing through the wavelength plate and first polarizer, and a 45° linearly polarized component when either linearly polarized light in the first direction or the second direction is taken as a reference is generated by the second combined light passing through the second polarizer. In such an invention, two optical components corresponding to the Stokes parameters can be obtained by means of the polarization adjustment portion comprising a wavelength plate and a polarizer.

In the Stokes parameter measurement device according to the present invention, the light-receiving portion in the above invention performs photoelectric conversion, separately, on optical intensity obtained corresponding to the circularly polarized component and the 45° linearly polarized component obtained from the first and second combined light emitted from the polarization adjustment portion, and on optical intensity of a 0° linearly polarized component and 90° linearly polarized component obtained from a polarized light beam not combined by the second splitting portion, among polarized light beams of the first group and second group emitted from the second splitting portion. Such an invention allows directly subjecting to photoelectric conversion respective optical components corresponding to the Stokes parameters.

In the Stokes parameter measurement device according to the present invention, the Stokes parameter measurement device in the above invention further comprises an operation circuit portion connected to the light-receiving portion, for obtaining Stokes parameters on the basis of optical intensity of the circularly polarized component, the 45° linearly polarized component, the 0° linearly polarized component, and the 90° linearly polarized component photoelectrically converted by the light-receiving portion. Such an invention allows obtaining Stokes parameters in which optical detection current values and so forth are subjected to necessary processing.

In the Stokes parameter measurement device according to the present invention, the birefringent prism provided in the first splitting portion is arranged such that polarized light split by the birefringent prism strikes once again the birefringent prism from the reverse direction of the incidence direction of the signal light, the birefringent prism doubling as one birefringent prism of the second splitting portion that generates and combines the polarized light beams. In such an invention, the birefringent prism of the first splitting portion can double as part of the second splitting portion, thereby saving space. Also, carrying out splitting and combining in a same prism allows matching the optical paths of the various combined light components with good precision, and, moreover, compensating easily the PMD of the combined light beams, thereby increasing the precision of the Stokes parameter measurement.

In the Stokes parameter measurement device according to the present invention, the first splitting portion doubling as a polarized light combining means in the above invention has a first surface onto which signal light to be measured is incident and a second surface from which split light is emitted; and the second splitting portion has a first and a second birefringent prism facing the second surface of the first splitting portion, and a reflective member arranged for the first and second birefringent prisms, at an opposite side of the first splitting portion. Such an invention allows efficiently confining the first splitting portion and the second splitting portion within the optical path that is bent back by the reflective member.

In the Stokes parameter measurement device according to the present invention, the optical axis of the birefringent prism constituting the first splitting portion, and the optical axes of the first and second birefringent prisms in the above invention are arranged at a relative angle of 45° when viewed from the optical axis direction. By causing the polarized light to pass through the second splitting portion, such an invention allows obtaining two light beams as the first group of polarized light beams, which are polarized light in the first direction, and two light beams as the second group of polarized light beams, which are polarized light in the second direction, and allows equalizing the splitting ratios of the light beams.

In the Stokes parameter measurement device according to the present invention, the birefringent prism constituting the first splitting portion and the first and second birefringent prisms in the above invention are formed of a same material, and a polarized light separation width of the birefringent prism constituting the first splitting portion is √2 times a polarized light separation width of the first and second birefringent prisms. Such an invention allows uniformizing vertically and horizontally the array pitch of the various split light passing through, and emitted from, the second splitting portion.

In the Stokes parameter measurement device according to the present invention, the second splitting portion in the above invention has a first prism portion for splitting polarized light split by the first splitting portion in a first and a second oblique direction; and a second prism portion for generating the first group of polarized light beams and the second group of polarized light beams from the polarized light split by the first prism, and for forming two sets of combined light in which one polarized light beam of the first group is combined with one polarized light beam of the second group. In such an invention, the birefringent prism provided in the first splitting portion need not double as part of the second splitting portion (such as means for splitting and combing polarized light), and hence there can be achieved a serial-arrangement optical system having a simple overall structure.

Also, a Stokes parameter measurement method according to the present invention comprises the steps of: (a) splitting signal light to be measured into polarized light of a first direction and polarized light of a second direction, by means of a first splitting portion having a birefringent prism; (b) generating, by means of a second splitting portion having a plurality of birefringent prisms, a first group of polarized light beams corresponding to the first direction and a second group of polarized light beams corresponding to the second direction, by further splitting the polarized light split by the first splitting portion through two steps; (c) combining at least one polarized light beam of the first group with at least one polarized light beam of the second group, by a predetermined combination, by means of the second splitting portion; (d)

adjusting, by means of a polarization adjustment portion, the polarization state of one or more among the combined light beams; and (e) determining an optical intensity component, a 0° polarized component, a 45° polarized component and a circularly polarized component, serving as Stokes parameters, on the basis of an output of a light-receiving portion for performing photoelectric conversion of an optical component of the signal light split by and emitted from the second splitting portion and the polarization adjustment portion.

Such an invention allows adjusting the splitting ratio through setting the optical axes of birefringent prisms, and allows directly obtaining a plurality of linearly polarized components. Herein, the splitting ratio in the first splitting portion and the second splitting portion barely fluctuates, as it depends on the arrangement of the birefringent prisms constituting the splitting portions. This simplifies, as a result, the adjustment operation of the splitting ratio, and allows suppressing temperature fluctuations of the splitting ratio. Moreover, no losses occur during splitting since light is split using birefringent crystals having a high extinction ratio. Herein, losses involve only losses by birefringent crystals having AR-coated surfaces. This allows hence obtaining, with little optical loss, optical components, corresponding to the Stokes parameters. The Stokes parameters can thus be measured with high precision.

DESCRIPTION OF THE PREFERRED EMBODIMENTS

Specific embodiments of the Stokes parameter measurement device and the Stokes parameter measurement method according to the present invention are explained next with reference to accompanying drawings. The invention, however, is not meant in any way to be limited to or by these embodiments.

First Embodiment

Figure 1:
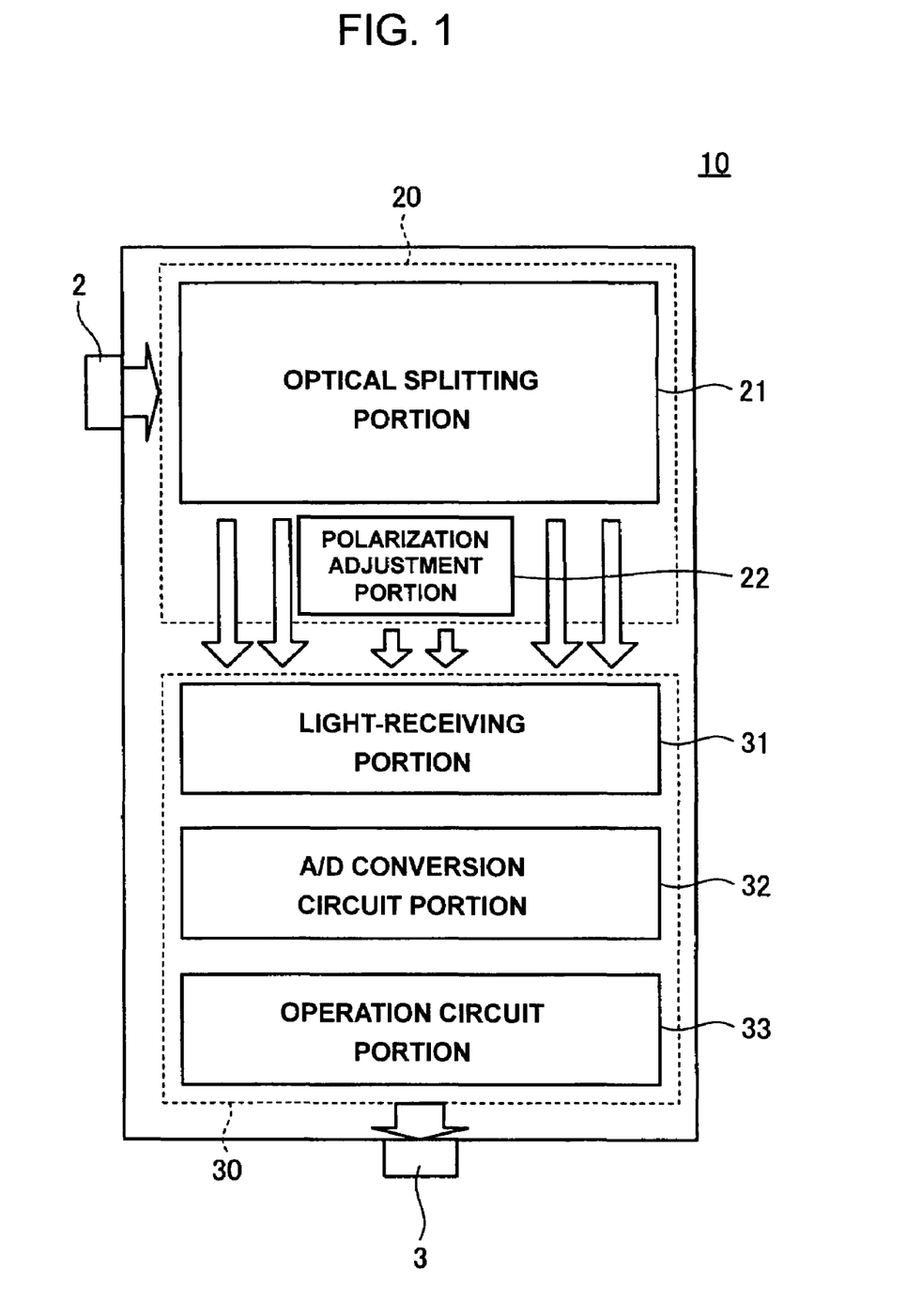
FIG. 1 is a block diagram illustrating the configuration of a Stokes parameter measurement device according to a first embodiment of the present invention.

FIG. 1 is a block diagram illustrating the constitution of a Stokes parameter measurement device according to a first embodiment of the present invention.

As illustrated in FIG. 1, the Stokes parameter measurement device 10 comprises an input portion 2, being an input portion comprising a receptacle, a collimator lens or the like, a polarization analyzer optical portion 20 being a polarized light splitting device, an electrical circuit portion 30, and an output portion 3 comprising a GP-IB or the like. The polarization analyzer optical portion 20 comprises an optical splitting portion 21 and a polarization adjustment portion 22, while the electrical circuit portion 30 comprises a light-receiving portion 31 having a photodiode or the like, an A/D conversion circuit portion 32 and an operation circuit portion 33. If necessary, the A/D conversion circuit portion 32 may be replaced by an analog output circuit portion. The operation circuit portion 33 may be omitted. If an analog output circuit portion is provided, such operation function can be built into the analog output circuit portion.

Figure 2A:
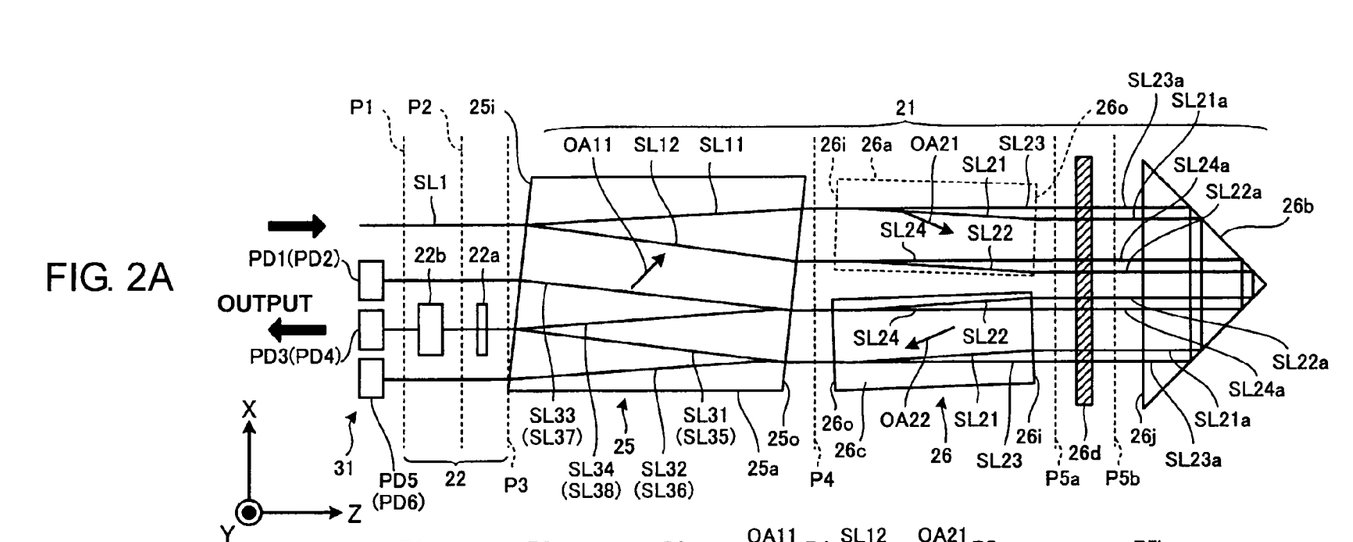
FIGS. 2A and 2B are diagrams illustrating a configuration example of an optical splitting portion, a polarization compensation portion and a light-receiving portion of FIG. 1, and for explaining the role of the optical splitting portion and of a polarization adjustment portion.
Figure 2B:
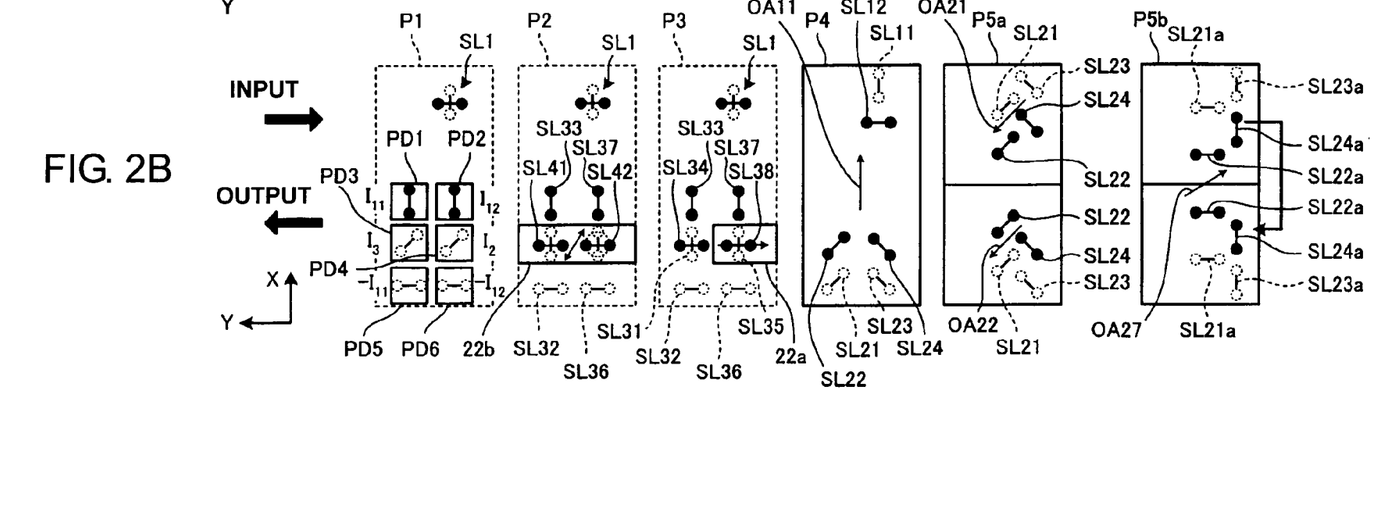

FIG. 2A is a diagram illustrating a configuration example of the optical splitting portion 21, the polarization adjustment portion 22 and the light-receiving portion 31 illustrated in FIG. 1. FIG. 2B is a conceptual diagram for explaining the role of the optical splitting portion 21 and the polarization adjustment portion 22. The diagrams illustrate light polarization states in cross sections P1 and so on, in an instance where the optical splitting portion 21 and so forth is observed from the right of the paper. For explaining polarization directions, in FIG. 2A there are defined XYZ axes, and in FIG. 2B there are defined XY axes.

The optical splitting portion 21, onto which signal light SL1 from the input portion 2 is incident, comprises a first optical system 25 composed of a single birefringent prism comprising a birefringent crystal, and a second optical system 26 composed of two birefringent prisms and the like comprising each a birefringent crystal. The first optical system 25 is a portion functioning as a first splitting portion. With a view to suppressing interference and return loss between optical planes of the crystal, the first optical system 25 comprises a birefringent prism 25a having a parallelogram shape in the XZ cross section. The XZ cross section of the birefringent prism 25a need not be a parallelogram. Herein, the birefringent prism 25a may be shaped so as to exhibit a rectangular-shaped in the XZ cross section and to have an optical plane oblique relative to the X-axis. The birefringent prism 25a may be carved out of a birefringent crystal such as rutile, $TiO_2$, $YVO_4$, LN or the like. The optical axis OA11 of the birefringent prism 25a is parallel to the XZ plane and has a constant inclination angle relative to the X-axis. The inclination angle is preferably in the vicinity of 45°, with a view to achieving a larger separation width between two polarized waves. If rutile is used, for instance, the inclination angle is set to 47.8°.

The signal light SL1, as the input incident on the first surface 25i of the birefringent prism 25a, is split into an extraordinary ray oscillating in the X direction, and an ordinary ray oscillating in the Y direction. That is, the birefringent prism 25a is an optical member doubling as a splitting element and a polarizing element. As illustrated in cross section P3 of FIG. 2B, the signal light SL1, comprising various polarized light, is split into a polarized component SL11 in the X-direction, as polarized light in a first direction, and a polarized component SL12 in the Y-direction, as polarized light in a second direction, as illustrated in cross section P4 of FIG. 2B. Herein, the splitting ratio of the polarized component SL11 and the polarized component SL12, which depends on the extinction ratio of the birefringent prism 25a or the like, takes a fixed value of about 1:1. The deviation from the ideal splitting ratio, which arises, for instance, from the extinction ratio, the characteristics of the crystal and the like, can be compensated by means of appropriate calibration using the below-described operation circuit portion 33. The polarized components SL11, SL12, which are two light beams emitted through a second surface 25o, can be made both into light beams that are parallel with precision to the signal light SL1 by suitably shaping the cross section of the birefringent prism 25a.

The second optical system 26 comprises a first birefringent prism 26a having an oblique rectangular shape in the XZ cross section, a right angle prism 26b, a second birefringent prism 26c having an oblique rectangular shape in the XZ cross section, and a ½ wavelength plate 26d. The first and second birefringent prisms 26a, 26c need not have an oblique rectangular shape in the XZ cross section, and may have a parallelogram shape, as does the birefringent prism 25a. The optical axis OA21 of the first birefringent prism 26a, which is different from that in the first optical system 25, has an inclination angle of 45° relative to the X-axis and the Y-axis. The first birefringent prism 26a is also carved out of a birefringent crystal such as rutile, $TiO_2$, $YVO_4$, LN or the like.

Herein, a pair of signal lights SL11, SL12 incident on an incidence surface 26i of the first birefringent prism 26a is split into an extraordinary ray oscillating in the direction of the optical axis OA21, and an ordinary ray oscillating in a perpendicular direction to the optical axis OA21. That is, out of the signal light SL11, SL12 passing through the first optical system 25 there are generated first obliquely polarized components SL21, SL22, being polarized light in an oblique direction tilted counterclockwise by 45° relative to the X-axis, and second obliquely polarized components SL23, SL24, being polarized light in an oblique direction tilted clockwise by 45° relative to the X-axis (see the upper half of cross section P5a). Herein, the splitting ratio of the first obliquely polarized components SL21, SL22 and the second obliquely polarized components SL23, SL24 depends, among others, on the relative angle between the optical axis OA11 of the birefringent prism 25a and the optical axis OA21 of the first birefringent prism 26a, and on the extinction ratio of the first birefringent prism 26a. In the present configuration, the splitting ratio takes a fixed value of substantially 1:1, although it need not necessarily be 1:1. Although there occur errors due to the processing precision of the birefringent crystal, arrangement precision and the like that cause divergence from a designed splitting ratio, such divergence from the ideal splitting ratio can be compensated by means of appropriate calibration using the below-described operation circuit portion 33. The first and second obliquely polarized components SL21 to SL24, which are four light beams emitted through the emission surface 26o can be made all into light beams that are parallel with precision to the signal light SL1 by suitably shaping the cross section of the first birefringent prism 26a.

Next, the right angle prism 26b is a triangular prism, having a right isosceles triangle shape in the XZ cross section and extending in the Y-direction. The right angle prism 26b has an oblique surface 26j facing the first optical system 25 and two total-reflection surfaces. The oblique surface 26j is tilted by two degrees relative to the optical axis, with a view to suppressing return loss. Through reflection twice in the two surfaces of the right angle prism 26b having equal edge length, light advancing in the +Z direction can be shifted in the –X direction by a predetermined spacing as they are made into light beams that advance reversely in the –Z direction. According to the Fresnel laws, when light is totally reflected at the right angle prism 26b, there occur different phase shifts in a horizontal component and a perpendicular component, relative to the normal of the total reflection plane.

In the present first embodiment, the ½ wavelength plate 26d, having an optical axis OA27 in a direction tilted counterclockwise by 22.5° relative to the X-axis or the Y-axis, is interposed between the first and second birefringent prism 26a, 26c and the right angle prism 26b. Before being incident on the right angle prism 26b, the first and second obliquely polarized components SL21 to SL24 pass through the ½ wavelength plate 26d, whereupon their polarization direction is rotated to convert their polarization state into polarized light in the X-direction or the Y-direction, respectively. The polarized components become then polarized components SL21a to SL24a (see upper half of cross section P5b). After passing through the right angle prism 26b, the components traverse once again the ½ wavelength plate 26d, whereby the polarized components SL21a to SL24a are reconverted into the first and second obliquely polarized components SL21 to SL24. As a result, the first and second obliquely polarized components SL21 to SL24 advancing in the +Z direction can be shifted in the –X direction by a predetermined spacing as they are made into light beams that advance reversely in the –Z direction, while preserving the polarization state and phase relationship thereof (see lower half of cross section P5a).

The second birefringent prism 26c has the same outer shape as the first birefringent prism 26a. Herein, the optical axis OA22 of the second birefringent prism 26c has an inclination angle of 45° relative to the X-axis and the Y-axis. In the present first embodiment, a prism identical to the first birefringent prism 26a and arranged rotated by 180° around the Z-axis is used as the second birefringent prism 26c. That is, the bill of materials can be reduced by using the same crystal as the first and the second birefringent prisms 26a, 26c.

The second birefringent prism 26c is also carved out of a birefringent crystal such as rutile, $TiO_2$, $YVO_4$, LN or the like, and has the function of regulating the arrangement of the first and second obliquely polarized components SL21 to SL24 that are incident on the incidence surface 26i. Among the first and second obliquely polarized components SL21 to SL24 that are incident on the incidence surface 26i, the first obliquely polarized components SL21, SL22, which are extraordinary rays oscillating in the direction of the optical axis OA22, have their position in the second birefringent prism 26c shifted so as to exit through the emission surface 26o with their position in the X-axis direction coinciding with that of the second obliquely polarized components SL23, SL24 (see lower half of cross section P4). The first and second obliquely polarized components SL21 to SL24, which are four light beams emitted through the emission surface 26o, can be made all into light beams that are parallel with precision to the signal light SL1 by suitably shaping the cross section of the second birefringent prism 26c.

Next, the first and second obliquely polarized components SL21 to SL24 emitted from the second birefringent prism 26c, i.e. emitted from the second optical system 26, are incident on a second surface 25o provided on the birefringent prism 25a of the first optical system 25, and exit through the first surface 25i. The birefringent prism 25a functions as a first splitting portion for the signal light SL1 incident from the forward direction, but functions also as a splitting-combining element of the second splitting portion, and as a polarizing element, for the first and second obliquely polarized components SL21 to SL24 incident from the reverse direction.

That is, as illustrated in the lower half of cross section P3 of FIG. 2B, the first obliquely polarized component SL21 is split by the birefringent prism 25a into a polarized component SL31 in the X-axis direction having oscillation along the optical axis OA11 of the birefringent prism 25a, and a polarized component SL32 in the Y-axis direction having oscillation perpendicular to the optical axis OA11, so that the polarized components SL31 and SL32 separate in the X-direction. Similarly, the first obliquely polarized component SL22 is split into an X-axis direction polarized component SL33 and a Y-axis direction polarized component SL34 that separate in the X-direction. Similarly, the second obliquely polarized component SL23 is split into an X-axis direction polarized component SL35 and a Y-axis direction polarized component SL36 that separate in the X-direction. Similarly, the second obliquely polarized component SL24 is split into an X-axis direction polarized component SL37 and a Y-axis direction polarized component SL38 that separate in the X-direction. That is, the polarized components SL31, SL33, SL35, SL37 in the X-axis direction corresponding to the first direction are split and made into a first group of polarized light beams, while the polarized components SL32, SL34, SL36, SL38 in the Y-axis direction corresponding to the second direction are split and made into a second group of polarized light beams.

The splitting ratio between the polarized components SL31, SL33, SL35, SL37 in the X-axis direction and the polarized components SL32, SL34, SL36, SL38 in the Y-axis direction depends on the relative angle between the optical axis OA11 of the birefringent prism 25a and the OA22 of the second birefringent prism 26c, as well as on the extinction ratio of the birefringent prism 25a. In the present embodiment, the splitting ratio takes a fixed value of substantially 1:1, though it need not necessarily be 1:1. As described above, divergence from the ideal splitting ratio, which is caused by deviation error from a designed splitting ratio, can be compensated by means of appropriate calibration using the below-described operation circuit portion 33.

Herein, the amount by which the polarized components SL31, SL35 are relatively shifted in the X-axis direction with respect to the polarized components SL32, SL36, and/or the amount by which the polarized components SL33, SL37 are relatively shifted in the X-axis direction with respect to the polarized components SL34, SL38, is equalized by the birefringent prism 25a to the amount by which the X-polarized component SL11 is shifted in the X-axis direction with respect to the Y-polarized component SL12. Even after passing through the first and the second birefringent prisms 26a, 26c, the relative spacing in the X-axis direction between the first obliquely polarized components SL21, SL22, and the relative spacing in the X-axis direction between the second obliquely polarized components SL23, SL24 are kept equal to the relative spacing in the X-axis direction between the polarized components SL11, SL12. The X-direction polarized component SL31 in a first group of one polarized light beam, and the Y-direction polarized component SL34 in a second group of one polarized light beam are combined on the first surface 25i of the birefringent prism 25a, and are emitted as perfectly superposed second combined light. Also, the X-direction polarized component SL35 in a first group of one polarized light beam, and the Y-direction polarized component SL38 in a second group of one polarized light beam are combined on the first surface 25i, and are outputted as perfectly superposed first combined light (see lower half of cross section P3).

Herein, the X-direction polarized component SL31 of the first group of one polarized light beam, the Y-direction polarized component SL34 of the second group of one polarized light beam, the X-direction polarized component SL35 of the first group of one polarized light beam, and the Y-direction polarized component SL38 of the second group of one polarized light beam traverse, respectively, an identical optical path length when passing through the optical splitting portion 21, as a result of passing back-and-forth through the birefringent prism 25a and of having a parallel polarization state when traversing the birefringent prisms 26a, 26c. That is, the first combined light and the second combined light recombine without relative phase shift between the X-polarized component and Y-polarized component of the split signal light SL1, and hence can be regarded to be identical to light split from the signal light SL1.

Herein it is necessary to control the amount of phase shift precisely. That is, if after splitting of the signal light SL1 by the birefringent prism 25a into the X-polarized component and Y-polarized component, these polarized components are to be recombined in another birefringent prism, then the length and disposition of the birefringent prisms must be adjusted with high precision. If such precision is low, the amount of phase shift between orthogonal polarizations that make up the combined light may exhibit temperature fluctuations, which may impair, as a result, the measurement precision of the Stokes parameter measurement device, depending on temperature. In the present first embodiment, however, splitting and combining of the signal light SL1 are both carried out by one birefringent prism 25a, which allows thus easily suppressing changes in the amount of phase shift due to temperature fluctuations.

Herein, the polarized components SL33, SL37, and the polarized components SL32, SL36 may be regarded, respectively, as light resulting from a X-direction polarized component and a Y-direction polarized component of light split from the signal light SL1. In the explanation thus far, the splitting ratios of such split lights have depended on the relative angle between respective birefringent prisms and on the extinction ratio of the birefringent prisms, but have been little influenced by changes in ambient temperature. Changes in ambient temperature do not influence herein the splitting ratio even if the positional relationship of the optical elements and the beams moves somewhat. Accordingly, the Stokes parameter measurement device 10 according to the present first embodiment allows realizing stable measurement irrespective of ambient temperature.

The Z-direction length of the birefringent prism 25a (polarized light separation width) is $\sqrt{2}$ times the Z-direction length (polarized light separation width) of the first and second birefringent prisms 26a, 26c. The relative angle of the optical axes of the birefringent prisms 25a, 26a, 26c is 45°. As a result, the Y-axis direction spacing of the first and second obliquely polarized components SL21, SL23 emitted from the second birefringent prism 26c becomes identical to the X-axis direction spacing of the first obliquely polarized components SL21, SL22 and/or the X-axis direction spacing of the polarized components SL31, SL32 and the like. Thus, the polarized component SL33, the polarized component SL37, the polarized components SL31, SL34 that make up the second combined light, the polarized components SL35, SL38 that make up the first combined light, the polarized component SL32 and the polarized component SL36 emitted through the first surface 25i of the birefringent prism 25a become arranged at an equal pitch relative to the X-axis and Y-axis directions.

Next, the polarization adjustment portion 22 comprises a phase element 22a comprising a ¼-wavelength plate or the like, and a polarizing element 22b comprising a transmission-type polarizing plate. Taking as a reference, i.e. as a 0° polarized component, the polarized components SL33, SL37, which are linearly polarized components oscillating in the X-direction, among the light polarized and separated by the birefringent prism 25a, the principal axis orientation of the phase element 22a as a wavelength plate corresponds to the orientation angle (i.e. Y-axis direction) perpendicular thereto. The polarization axis, i.e. the principal axis orientation of the polarizing element 22b as a polarizer corresponds to a 45° polarization orientation angle (i.e. a direction 45° oblique relative to the X-axis: −45° viewed from the prism side) with respect to the 0° polarized component. The principal axis orientations of the phase element 22a and the polarizing element 22b may also be combined with 45° and 0°. The phase element 22a is arranged on the optical path of the polarized components SL35, SL38 that make up the first combined light (see cross section P3), while the polarizing element 22b is arranged on the optical path of the polarized components SL31, SL34 that make up the second combined light and the polarized components SL35, SL38 that make up the first combined light (see cross section P2). As a result, the first combined light passing through the phase element 22a and the polarizing element 22b becomes a polarized component SL42 which corresponds to a right-handed circularly polarized component extracted from the signal light SL1. The second combined light passing through the polarizing element 22b becomes a polarized component SL41 which is corresponds to a component for 45° polarization orientation angle extracted by the polarizing element 22b.

Figure 3:
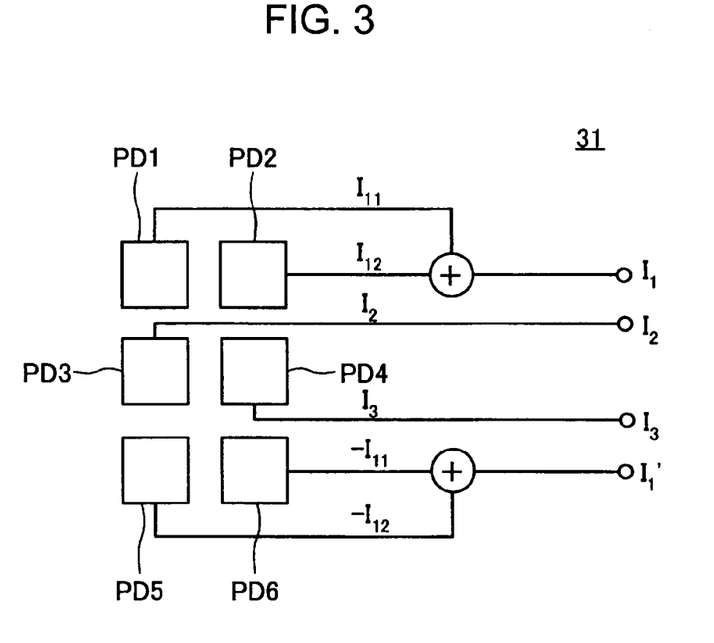
FIG. 3 is a diagram for explaining the specific configuration of the light-receiving portion of FIG. 1.

Next, FIG. 3 is a block diagram for explaining the light-receiving portion 31 in the electrical circuit portion 30 of the Stokes parameter measurement device 10 illustrated in FIG. 1. The light-receiving portion 31 has six photodiodes PD1 to PD6, which are photoelectric conversion elements, arranged at equal pitch in accordance with the disposition of the polarized components that pass through the optical splitting portion 21 and the polarization adjustment portion 22. The first and second photodiodes PD1, PD2 are connected in series, the outputs thereof $I_{11}$, $I_{12}$ being added and outputted as a current value $I_1$. The fifth and sixth photodiodes PD5, PD6 are connected in parallel, the outputs thereof $-I_{11}$, $-I_{12}$ being added and outputted as the current value $I_1'$. Although the first and second photodiodes PD1, PD2 are connected in parallel, herein there may be used the output of only one among them. The same applies to the fifth and sixth photodiodes PD5, PD6. The output of the third photodiode PD3 is outputted without modification, as a current value $I_2$. The output of the fourth photodiode PD4 is outputted without modification, as a current value $I_3$.

As illustrated in FIG. 2B, the polarized component SL33 strikes as-is the first photodiode PD1. Similarly, the polarized component SL37 strikes as-is the second photodiode PD2, the polarized component SL32 strikes as-is the fifth photodiode PD5, and the polarized component SL36 strikes as-is the sixth photodiode PD6. The polarized component SL41 obtained from the second combined light strikes the third photodiode PD3, while the polarized component SL42 obtained from the first combined light strikes the fourth photodiode PD4. That is, the polarized components of 0° polarization orientation angle of the signal light SL1 strike dividedly the first and second photodiodes PD1, PD2, respectively, while the polarized components of 90° polarization orientation angle of the signal light SL1 strike dividedly the fifth and sixth photodiodes PD5, PD6, respectively. Meanwhile, the polarized component of 45° polarization orientation angle of the signal light SL1 strikes the third photodiode PD3, while the right-handed circularly polarized component of the signal light SL1 strikes the fourth photodiode PD4.

Stokes parameters are ordinarily determined be measuring the power of signal light and measuring the power of the 0°, 45° and circularly polarized components of the signal light. In the present first embodiment, the addition sum of the signal output $I_1 = I_{11} + I_{12}$ resulting from adding the first and second photodiodes PD1, PD2, and the signal output $I_1' = -I_{11} + (-I_{12})$ resulting from adding the fifth and sixth photodiodes PD5, PD6, corresponds to the intensity of the signal light, which is one of the Stokes parameters. The signal output $I_1 = I_{11} + I_{12}$ resulting from adding the first and second photodiodes PD1, PD2 corresponds to the intensity of the polarized component of 0° polarization orientation angle, which is one of the Stokes parameters. The signal output $I_2$ of the third photodiode PD3 corresponds to the intensity of the polarized component of 45° polarization orientation angle, while the signal output $I_3$ of the fourth photodiode PD4 corresponds to the intensity of the right-handed circularly polarized component.

Next, the A/D conversion circuit portion 32 converts to digital data the signal output $I_1$ of the first and second photodiodes PD1, PD2, the signal output $I_2$ of the third photodiode PD3, the signal output $I_3$ of the fourth photodiode PD4, and the signal output $I_1'$ of the fifth and sixth photodiodes PD5, PD6.

The operation circuit portion 33, which is an operation circuit portion for the final calculation of the Stokes parameters, performs addition and/or coefficient processing on the outputs $I_1$, $I_2$, $I_3$, $I_1'$, which are signals digitalized by the A/D conversion circuit portion 32. As described above, compensating calibration can be carried out herein taking into account the splitting ratio of the birefringent prisms 25a, 26a, 26c. In the present first embodiment, light power splitting and polarized component separation are carried out simultaneously. However, as can be grasped from the explanation heretofore, the polarized components can hypothetically be regarded to be extracted after splitting of the signal light into four rays. Taking $I_{1in}$, $I_{2in}$, $I_{3in}$, $I_{1in}'$ as the powers corresponding to the $I_1$, $I_2$, $I_3$, $I_1'$ after four-way splitting, and taking the ratio between $I_{1in}'$ and the powers after respective splitting as the splitting ratio $I_{ir} = I_i/I_1'$, the Stokes parameters are given by the normalized values represented by formula (1). The splitting ratio of the four polarized components, which is arbitrary, is 2:1:1:2 in the configuration of FIG. 2.

$$S_0 = 1$$

$$S_i = \{2 \cdot I_i/(I_0 \cdot I_{ir})\} - 1 \quad (i=1, 2, 3) \tag{1}$$

wherein $I_0 = (I_1/I_{1r}) + I_1'$

Figure 4:
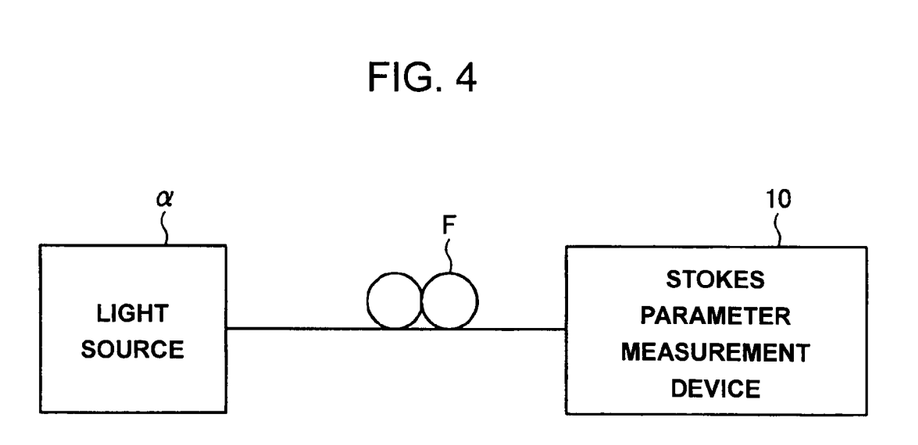
FIG. 4 is a diagram for explaining a compensating calibration method carried out in the measurement device of FIG. 1.

Specifically, as illustrated in FIG. 4, there is prepared an input light source α capable of emitting completely polarized light, so that completely polarized light from the light source α is inputted into the Stokes parameter measurement device 10 while the position state of the completely polarized light is modified via a polarization controller F.

The splitting ratio can be measured approximately in accordance with the following two methods.

(1) Setting the splitting ratio $I_{ir}$ to the ratio of the respective maximum values of $I_1$, $I_2$, $I_3$, $I_1'$.

(2) $I_{1r} = 1$, i.e., the splitting ratio corresponding to $I_1$ and $I_1'$ is assumed to be 1, and since $I_0$ is determined as $I_0 = I_1 + I_1'$, the splitting ratio of $I_2$ and $I_3$ relative to $I_0$ is measured in real time as a splitting ratio $I_{ir} = (I_i/I_0)_{max}$ (i=2, 3).

Accurate splitting ratio parameters can be obtained, using data measured as described above, in accordance, for instance, with the method disclosed in Japanese Patent Application Publication No. 2006-284397, on the basis of fitting of maximum and minimum values. The deviation from orthogonality of each to the above Stoke parameter components can be compensated through the above method, to afford high-precision measurement. The degree of polarization DOP can be calculated herein using formula (2).

$$DOP=(S_1^2+S_2^2+S_3^2)^{1/2}/S_0 \qquad (2)$$

The Stokes parameter measurement device 10 can be operated as a DOP monitor by endowing the operation circuit portion 33 with the function of calculating formula (2). The Stokes parameters and the DOP value can be calculated that way. In such a method, light splitting in the polarization analyzer optical portion 20, which is a polarization splitting device, is determined by the machining precision and/or arrangement precision of the birefringent prisms 25a, 26a, 26c, and is thus less likely to be influenced by temperature and the like. As a result, PDL and the like can be kept structurally small in the polarization analyzer optical portion 20, which separates and combines light stably and with high precision. This allows configuring thus a Stokes parameter measurement device, i.e. an optical polarization analyzer, having enhanced precision.

The arrangement pitch of the six photodiodes PD1 to PD6 can be modified in accordance with the material, the Z-direction length, and the optical axis direction of the birefringent prisms 25a, 26a, 26c. The structure of the birefringent prisms 25a, 26a, 26c can also be modified depending on the arrangement of the photodiodes PD1 to PD6. The Stokes parameter measurement device 10 can be made smaller and inexpensive, through a reduced array pitch of the photodiodes PD1 to PD6, by making the birefringent prisms 25a, 26a, 26c smaller. However, this increases the likelihood of vignetting of the signal light SL1 by the phase element 22a and/or the polarizing element 22b and the photodiodes PD1 to PD6. With a view to securing the positional precision tolerance of the various elements in the present first embodiment, an appropriate optical system is provided in the input portion 2, to condense the signal light SL1, reducing thereby beam size, and reducing to a spot size the light striking the photodiodes PD1 to PD6 and so forth.

In the present first embodiment, the incidence and emission surfaces 25i, 25o, 26i, 26o of the birefringent prisms 25a, 26a, 26c are tilted relative to the optical axis, i.e. the Z-axis. This is done for preventing return light and interference. However, these tilt angles can be suitably modified in accordance with the specifications of the device. In the figures, the phase element 22a, the polarizing element 22b and the photodiodes PD1 to PD6 are arranged without tilt, but they may also be arranged with an arbitrary tilt relative to the optical axes.

Variations of the First Embodiment

Several variations of the first embodiment are explained next. Portions that are not specifically explained are identical to those of the Stokes parameter measurement device 10 of the first embodiment, and hence a repeated explanation thereof will be omitted.

[Variation 1]

Figure 5:
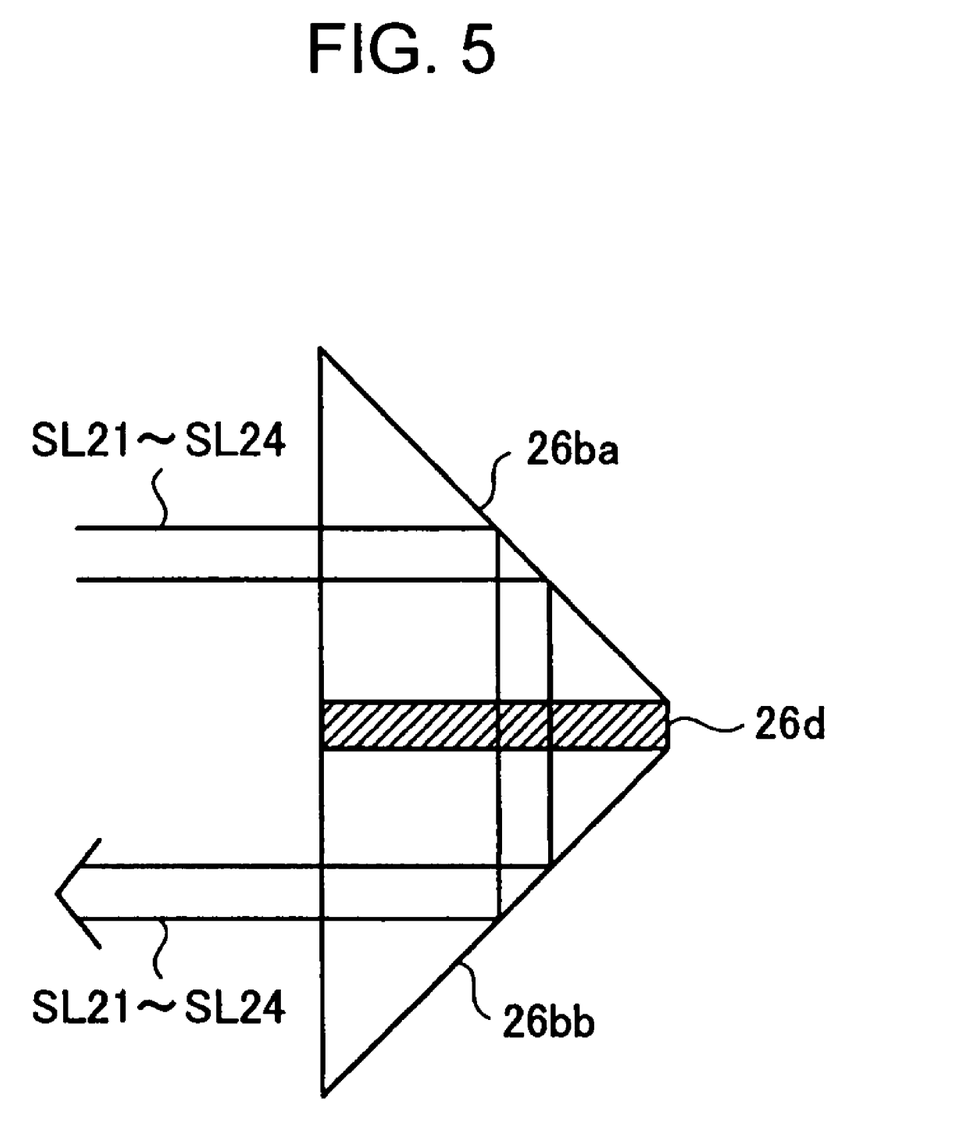
FIG. 5 is a diagram illustrating the arrangement of a right angle prism and a ½-wavelength plate comprised in a Stokes parameter measurement device according to variation 1 of the first embodiment.

FIG. 5 is a diagram illustrating the arrangement of a right angle prism and a ½-wavelength plate comprised in a Stokes parameter measurement device according to Variation 1 of the first embodiment. As illustrated in FIG. 5, in the present variation 1 the ½ wavelength plate 26d of the first embodiment is interposed between a right angle prism 26ba and a right angle prism 26bb that are identical to the right angle prism 26b of the first embodiment. Through such a configuration, the first and second obliquely polarized components SL21 to SL24 advancing in the +Z direction can be shifted in the −X direction by a predetermined spacing as they are made into light beams that advance reversely in the −Z direction, and while preserving the polarization state and the phase relationship, as was the case in the first embodiment.

[Variation 2]

Figure 6A:
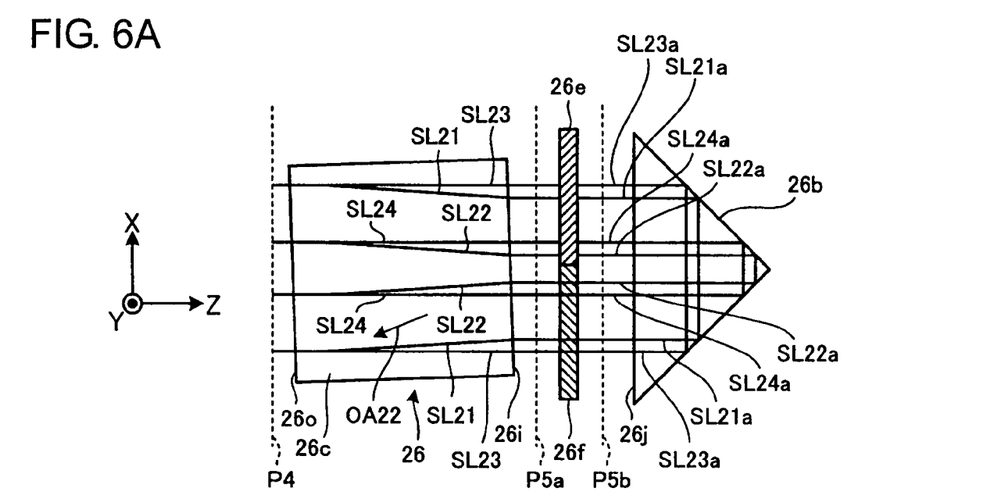
FIGS. 6A and 6B are diagrams illustrating part of the optical splitting portion of a Stokes parameter measurement device according to variation 2 of the first embodiment, and for explaining the role of the optical splitting portion.
Figure 6B:
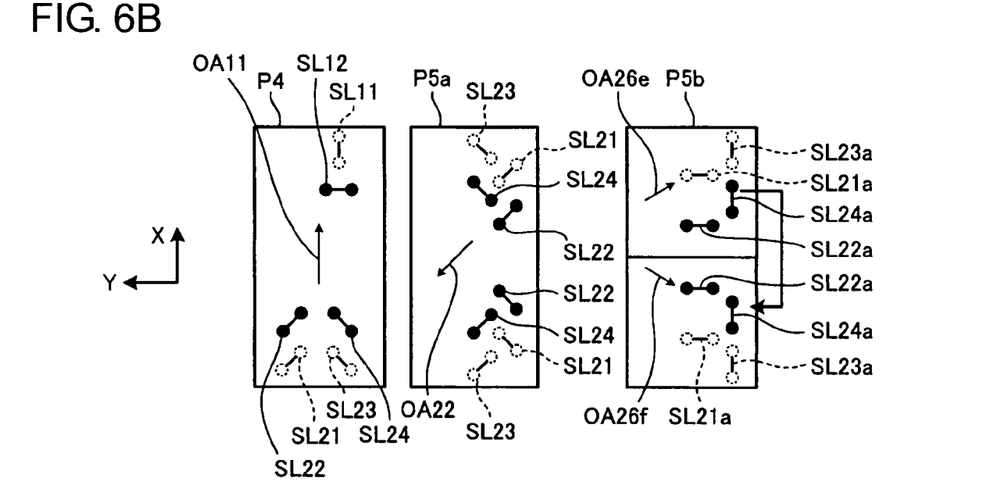

FIG. 6A is a diagram illustrating part of an optical splitting portion of a Stokes parameter measurement device according to Variation 2 of the first embodiment, and FIG. 6B is a conceptual diagram for explaining the role of the optical splitting portion. In Variation 2, instead of using a first and second birefringent prisms 26a, 26c, as was the case in the first embodiment, the height of the second birefringent prism 26c is made greater, while the first and second obliquely polarized components SL21 to SL24 are made to pass through the second birefringent prism 26c both when advancing in the +Z direction and in the −Z direction, as illustrated in FIGS. 6A and 6B. Also, there are arranged a ½ wavelength plate 26e and a ½ wavelength plate 26f instead of the ½ wavelength plate 26d of the first embodiment. The ½ wavelength plate 26e has an optical axis OA26e in a direction tilted counterclockwise by 22.5° relative to the X-axis or the Y-axis, while the ½ wavelength plate 26f has an optical axis OA26f in a direction tilted clockwise by 22.5° relative to the X-axis or the Y-axis. Through such a configuration, the first and second obliquely polarized components SL21 to SL24 advancing in the +Z direction can be shifted in the −X direction by a predetermined spacing as they are made into light beams that advance reversely in the −Z direction, and while preserving the polarization state and the phase relationship, as was the case in the first embodiment.

[Variation 3]

Figure 7A:
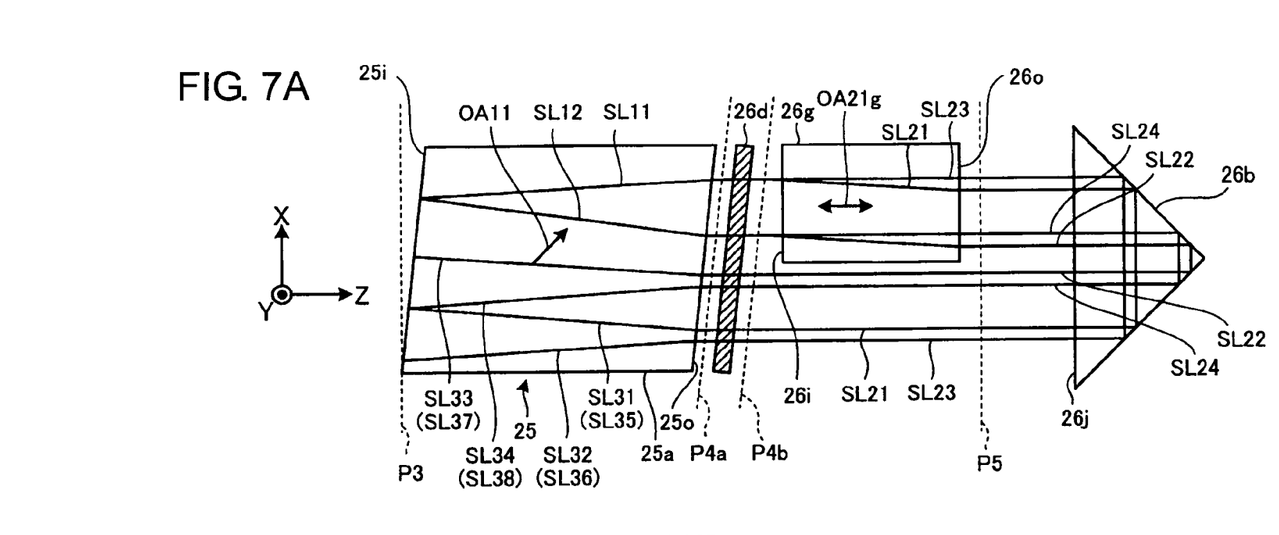
FIGS. 7A and 7B are diagrams illustrating part of the optical splitting portion of a Stokes parameter measurement device according to variation 3 of the first embodiment, and for explaining the role of the optical splitting portion.
Figure 7B:
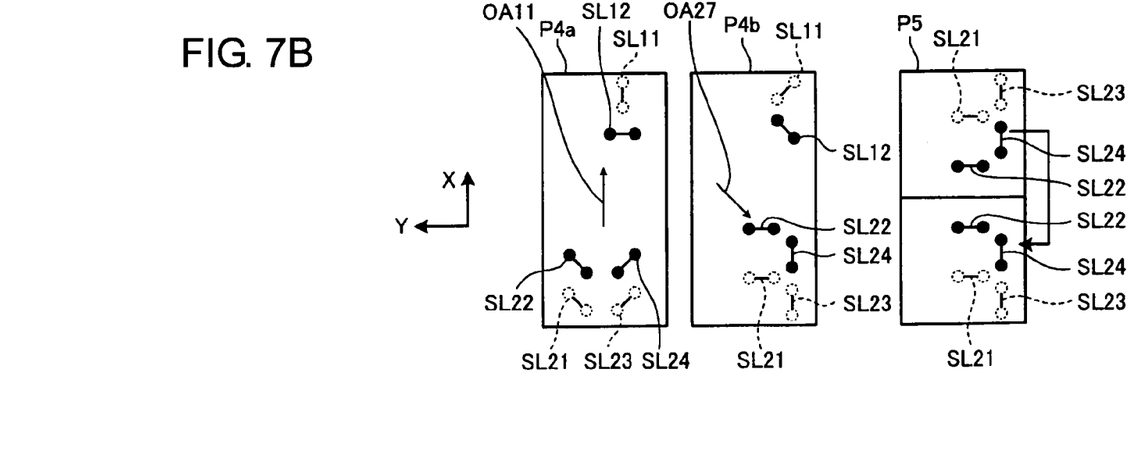

FIG. 7A is a diagram illustrating part of an optical splitting portion of a Stokes parameter measurement device according to Variation 3 of the first embodiment, and FIG. 7B is a conceptual diagram for explaining the role of the optical splitting portion. In Variation 3, the ½ wavelength plate 26d is arranged adjacent to the birefringent prism 25a, as illustrated in FIGS. 7A and 7B in the first embodiment. At the same time, the first birefringent prism 26a of the first embodiment is replaced by a birefringent prism 26g of the same material as the birefringent prism 25a, while the second birefringent prism 26c is omitted. The optical axis OA21g of the birefringent prism 26g is parallel to the YZ plane and has an inclination angle of 47.8° relative to the Y-axis. Through such a configuration, the first and second obliquely polarized components SL21 to SL24 advancing in the +Z direction can be shifted in the −X direction by a predetermined spacing as they are made into light beams that advance reversely in the −Z direction, and while preserving the polarization state and the phase relationship, as was the case in the first embodiment.

Second Embodiment

A Stokes parameter measurement device according to a second embodiment is explained next. The Stokes parameter measurement device of the present embodiment is a further variation of the Stokes parameter measurement device 10 of the first embodiment. Herein, portions that are not specifically explained are identical to those of the Stokes parameter measurement device 10 of the first embodiment, and hence a repeated explanation thereof will be omitted.

Figure 8A:
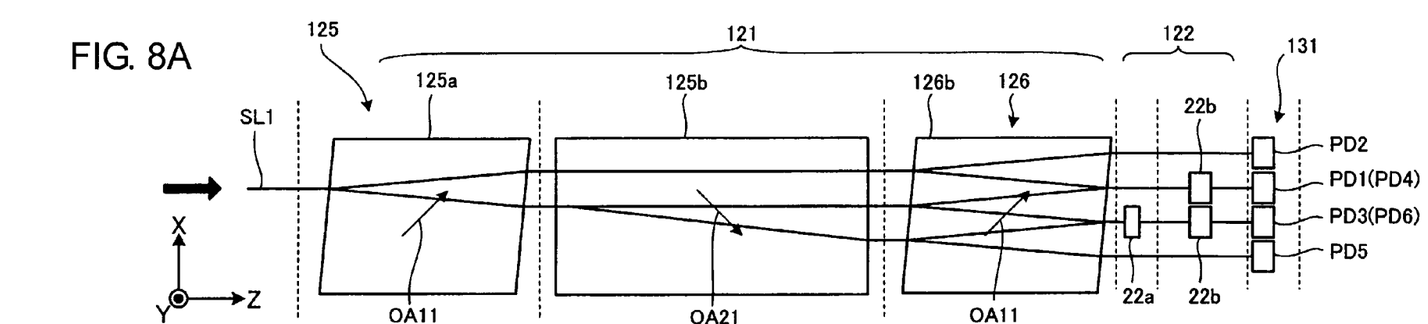
FIGS. 8A and 8B are diagrams illustrating a configuration example of an optical splitting portion and so forth in a measurement device according to a second embodiment, and for explaining the role of the optical splitting portion and so forth.
Figure 8B:
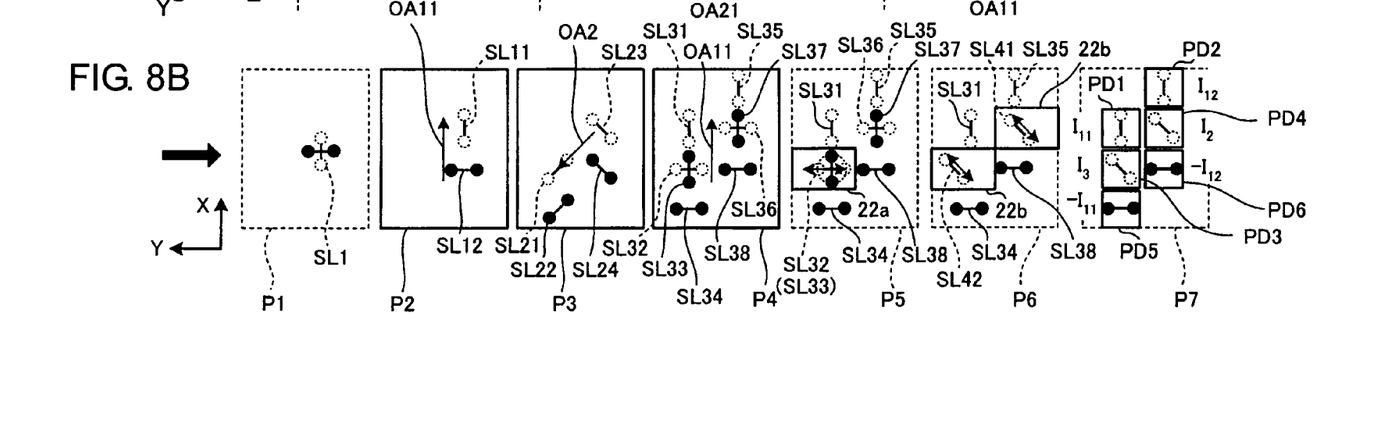

FIG. 8A, which corresponds to FIG. 2A, illustrates a configuration example of an optical splitting portion 121, a polarization adjustment portion 122 and a light-receiving portion 131 constituting the Stokes parameter measurement device according to the second embodiment. FIG. 8B is a conceptual diagram for explaining the role of the optical splitting portion 121 and the polarization adjustment portion 122.

The optical splitting portion 121 comprises a first optical system 125 comprising a single birefringent prism, and a second optical system 126 comprising two birefringent prisms or the like. The first optical system 125, which is a portion functioning as a first splitting portion, comprises a birefringent prism 125a having a parallelogram shape in the XZ cross section. The second optical system 126, which is a portion functioning as a second splitting portion, comprises birefringent prisms 126a, 126b having a parallelogram shape in the XZ cross section. The birefringent prism 125a has an optical axis OA11 and so forth identical to that of the birefringent prism 25a of the first embodiment, but herein the signal light SL1 strikes the birefringent prism 125a only from one side. The birefringent prism 126a has an optical axis OA21 and so forth identical to that of the birefringent prism 26a of the first embodiment, but the length of the birefringent prism 126a is twice that of the first birefringent prism 26a. The birefringent prism 126b has an optical axis OA11 identical to that of the birefringent prism 125a provided in the first optical system 125.

That is, the birefringent prism 125a is an optical member doubling as splitting element and a polarizing element. The signal light SL1 illustrated in cross section P1 of FIG. 8B is split into an X-polarized component SL11, being polarized light in a first direction, and a Y-polarized component SL12, being polarized light in a second direction, as illustrated in cross section P2 of FIG. 5B. Herein, the splitting ratio of the X-polarized component SL11 and the Y-polarized component SL12 takes a fixed value of substantially 1:1.

The first birefringent prism 126a, which is a first prism portion for splitting a polarized component for a 45° direction, splits signal lights SL11, SL12 emitted through the birefringent prism 125a, to generate first obliquely polarized components SL21, SL22 and second obliquely polarized components SL23, SL24 (see cross section P3). Herein, the splitting ratio of the first obliquely polarized components SL21, SL22 and of the second obliquely polarized components SL23, SL24 is a fixed value of substantially 1:1.

The birefringent prism 126b is a first prism portion doubling as a splitting element and a combining element. As illustrated in cross section P4, the polarized component SL21 is split by the birefringent prism 126b into a polarized component SL31 and a polarized component SL32 that separate in the X-direction. Similarly, the polarized component SL22 is split into a polarized component SL33 and a polarized component SL34 that separate in the X-direction. Similarly, the polarized component SL23 is split into a polarized component SL35 and a polarized component SL36 that separate in the X-direction, and the polarized component SL24 is split into a polarized component SL37 and a polarized component SL38 that separate in the X-direction.

The X-direction polarized component SL33 and the Y-direction polarized component SL32 exit through the emission surface of the birefringent prism 126b as a perfectly superposed first combined light, while the X-direction polarized component SL37 and the Y-direction polarized component SL36 do so as a perfectly superposed second combined light. The Y-axis direction spacing of the polarized components SL31, SL32, SL33, SL34 of a first group of polarized light beams, and of the polarized components SL35, SL36, SL37, SL38 of a second group of polarized light beams, emitted from the second birefringent prism 126b, is identical to the X-axis direction spacing of the various polarized components SL31 to SL38. Thus, the polarized component SL31 emitted through the birefringent prism 126b, the polarized component SL35, the polarized components SL32, SL33 that make up the first combined light, the polarized components SL36, SL37 that make up the second combined light, the polarized component SL34, and the polarized component SL38 become arranged at an equal pitch relative to the X-axis and Y-axis directions.

In the polarization adjustment portion 122, the phase element 22a is arranged on the optical path of the polarized components SL32, SL33 that make up the first combined light, while the polarizing element 22b is arranged on the optical path of the polarized components SL32, SL33 that make up the first combined light and of the polarized components SL36, SL37 that make up the second combined light. As a result, the first combined light passing through the phase element 22a and the polarizing element 22b becomes a polarized component SL42, which corresponds to an extracted component of right-handed circularly polarized light. The second combined light passing through the polarizing element 22b becomes a polarized component SL41 which corresponds to a component for 45° polarization orientation angle extracted by the polarizing element 22b.

In the light-receiving portion 131, the polarized component SL31 strikes as-is the first photodiode PD1; similarly, the polarized component SL35 strikes as-is the second photodiode PD2, the polarized component SL34 strikes as-is the fifth photodiode PD5, and the polarized component SL38 strikes as-is the sixth photodiode PD6, as illustrated in FIG. 8B. The polarized component SL42 obtained from the first combined light strikes the third photodiode PD3, while the polarized component SL41 obtained from the second combined light strikes the fourth photodiode PD4. That is, the polarized components of 0° polarization orientation angle of the signal light SL1 strike dividedly the first and second photodiodes PD1, PD2, respectively, while the polarized components of 90° polarization orientation angle of the signal light SL1 strike dividedly the fifth and sixth photodiodes PD5, PD6, respectively. Meanwhile, the circularly polarized component of the signal light SL1 strikes the third photodiode PD3, while the polarized component of 45° polarization orientation angle of the signal light SL1 strikes the fourth photodiode PD4.

Herein, the addition sum of the signal output $I_1=I_{11}+I_{12}$ resulting from adding the first and second photodiodes PD1, PD2, and of the signal output $I_1'=-I_{11}+(-I_{12})$ resulting from adding the fifth and sixth photodiodes PD5, PD6, yields a total current value $I_0$ that corresponds to the signal intensity, which is one of the Stokes parameters. The signal output $I_1=I_{11}+I_{12}$ resulting from adding the first and second photodiodes PD1, PD2 corresponds to the intensity of the polarized component of 0° polarization orientation angle, which is one of the Stokes parameters. The signal output $I_3$ of the third photodiode PD3 corresponds to the intensity of the right-handed circularly polarized component, while the signal output $I_2$ of the fourth photodiode PD4 corresponds to the intensity of the polarized component of 45° polarization orientation angle. The Stokes parameters $S_0$ to $S_3$ can be obtained from these current values $I_0$, $I_1$, $I_2$, $I_3$ as already explained (see formula (1) above).

Although in the Stokes parameter measurement device of the second embodiment it is necessary to increase PMD (polarization mode dispersion) precision generated by the birefringent prism 125a and the birefringent prism 126b, the structure of the second embodiment is simple, as there is no optical path fold-back. In the second embodiment, moreover, there are fewer transmissive optical surfaces than in the first embodiment, which allows reducing optical loss.

Third Embodiment

A Stokes parameter measurement device according to a third embodiment is explained next. The Stokes parameter measurement device of the present embodiment is a further variation of the Stokes parameter measurement device 10 of the first embodiment.

Figure 9:
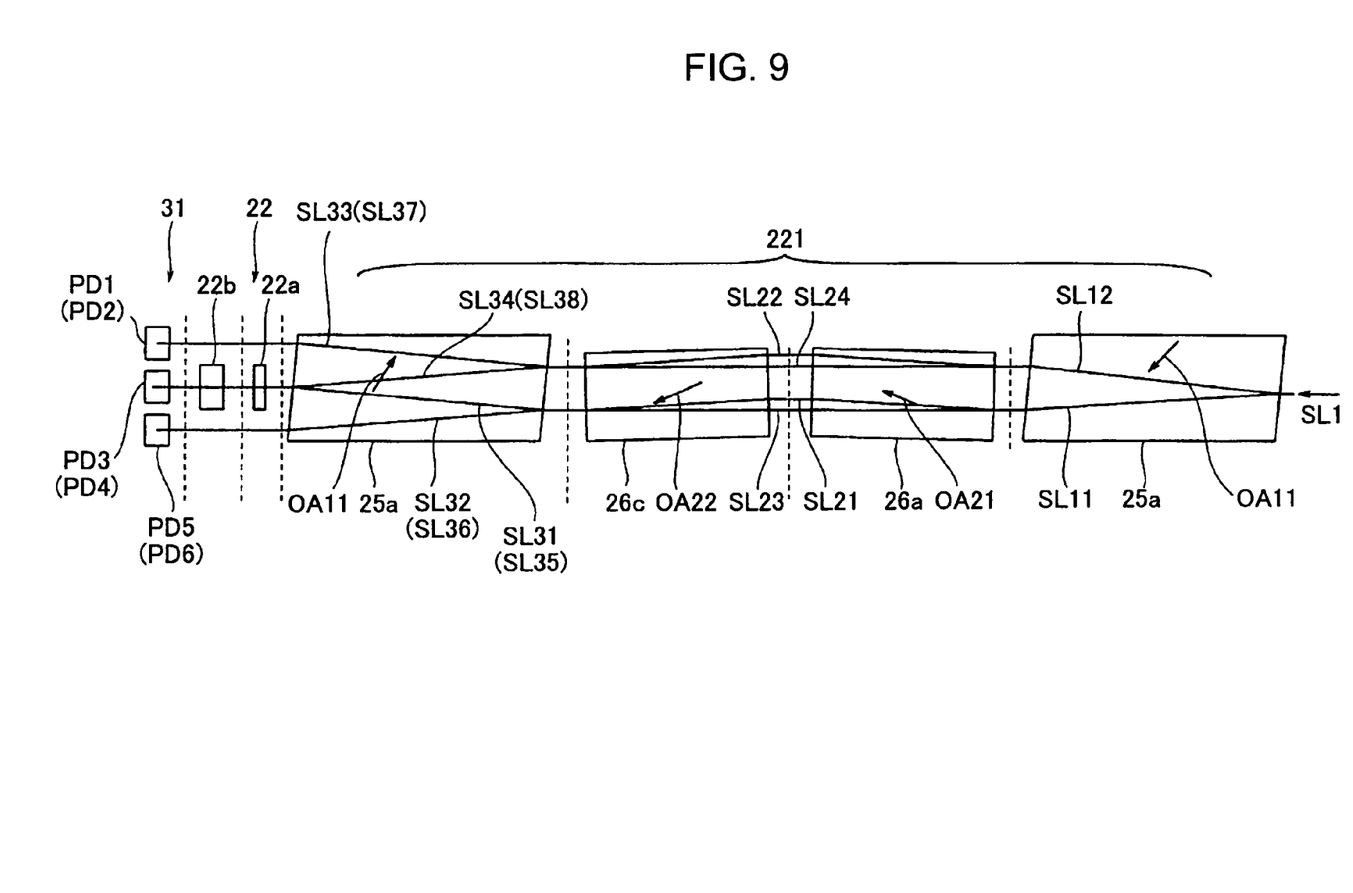
FIG. 9 is a diagram for explaining an optical splitting portion and so forth in a measurement device according to a third embodiment.

FIG. 9, which corresponds to FIG. 2A, illustrates a configuration example of an optical splitting portion 221, a polarization adjustment portion 22 and a light-receiving portion 31 comprised by a Stokes parameter measurement device according to the third embodiment. In the present third embodiment, the optical splitting portion 221 has a serial arrangement.

The optical splitting portion 221 comprises a pair of birefringent prisms 25*a*, 25*a* and, sandwiched therebetween, a pair of birefringent prisms 26*a*, 26*c*. The birefringent prisms 25*a*, 25*a*, 26*a*, 26*c* are identical to those of the first embodiment, but herein the right angle prism 26*b* is omitted so that the signal light travels straight-ahead. Hence, the birefringent prism 25*a* of FIG. 2 is divided in two. The Stokes parameter measurement device of the present third embodiment, like that of the second embodiment, has a simple structure and allows reducing optical loss in transmissive optical surfaces.

The present invention has been explained based on the above embodiments, but it is not meant in any way to be limited to or by those embodiments. The present invention can be realized according to various embodiments without departing from the spirit and scope thereof.

For instance, the configuration of the polarization adjustment portion 22 depicted in FIG. 2A is merely illustrative in nature, while the arrangement positions and/or optical axis directions of the phase element 22*a* and/or the polarizing element 22*b* may be arbitrarily modified, modifying then accordingly the processing carried out in the operation circuit portion 33.

What is claimed is:

1. A Stokes parameter measurement device, comprising:
   a polarization splitting device which comprises an optical element formed of a birefringent crystal material and which, by means of the optical element, splits signal light to be measured into a plurality of polarized light beams and adjusts the polarization state of one or more among the plurality of polarized light beams; and
   a light-receiving portion for performing photoelectric conversion of an optical component of the signal light split by and emitted from said polarization splitting device.

2. The Stokes parameter measurement device according to claim 1, wherein said polarization splitting device comprises a first splitting portion for splitting signal light to be measured into polarized light of a first direction and polarized light of a second direction perpendicular to the first direction, by means of a birefringent prism; a second splitting portion for, by means of a plurality of birefringent prisms, generating a first group of polarized light beams corresponding to said first direction and a second group of polarized light beams corresponding to said second direction, by further splitting the polarized light split by said first splitting portion through two steps, and for combining at least one polarized light beam of said first group with at least one polarized light beam of said second group, by a predetermined combination; and a polarization adjustment portion for adjusting the polarization state of one or more among the light beams combined by said second splitting portion.

3. The Stokes parameter measurement device according to claim 2, wherein said polarization adjustment portion has a wavelength plate for carrying out predetermined phase adjustment on first combined light in which a first polarized light beam among said first group is combined with a first polarized light beam among said second group; a first polarizer for extracting a predetermined polarized component from said first combined light passing through said wavelength plate; and a second polarizer for extracting a predetermined polarized component from second combined light in which a second polarized light beam among said first group is combined with a second polarized light beam among said second group.

4. The Stokes parameter measurement device according to claim 3, wherein said wavelength plate is a ¼ wavelength plate, and wherein a circularly polarized component when either linearly polarized light in said first direction or said second direction is taken as a reference is generated by said first combined light passing through said wavelength plate and first polarizer, and a 45° linearly polarized component when either linearly polarized light in said first direction or said second direction is taken as a reference is generated by said second combined light passing through said second polarizer.

5. The Stokes parameter measurement device according to claim 4, wherein said light-receiving portion performs photoelectric conversion, separately, on optical intensity obtained corresponding to said circularly polarized component and said 45° linearly polarized component obtained from said first and second combined light emitted from said polarization adjustment portion, and on optical intensity of a 0° linearly polarized component and 90° linearly polarized component obtained from a polarized light beam not combined by said second splitting portion, among polarized light beams of said first group and second group emitted from said second splitting portion.

6. The Stokes parameter measurement device according to claim 5, further comprising an operation circuit portion connected to said light-receiving portion, for obtaining Stokes parameters on the basis of optical intensity of said circularly polarized component, said 45° linearly polarized component, said 0° linearly polarized component, and said 90° linearly polarized component photoelectrically converted by said light-receiving portion.

7. The Stokes parameter measurement device according to any one of claims 2 to 6, wherein said birefringent prism provided in said first splitting portion is arranged such that polarized light split by the birefringent prism strikes once again the birefringent prism from the reverse direction of the incidence direction of said signal light, the birefringent prism doubling as one birefringent prism of said second splitting portion that generates and combines said polarized light beams.

8. The Stokes parameter measurement device according to claim 7, wherein said first splitting portion has a first surface onto which signal light to be measured is incident and a second surface from which split light is emitted, and wherein said second splitting portion has a first and a second birefringent prism facing the second surface of said first splitting portion, and a reflective member arranged for said first and second birefringent prisms, at an opposite side of said first splitting portion.

9. The Stokes parameter measurement device according to claim 8, wherein the optical axis of said birefringent prism constituting said first splitting portion, and the optical axes of said first and second birefringent prisms are arranged at a relative angle of 45° when viewed from the optical axis direction.

10. The Stokes parameter measurement device according to claim 9, wherein said birefringent prism constituting said first splitting portion, and said first and second birefringent prisms, are formed of a same material, and a polarized light separation width of said birefringent prism constituting said first splitting portion is $\sqrt{2}$ times a polarized light separation width of said first and second birefringent prisms.

11. The Stokes parameter measurement device according to claim 2, wherein said second splitting portion has a first prism portion for splitting polarized light split by said first splitting portion in a first and a second oblique direction; and a second prism portion for generating said first group of polarized light beams and said second group of polarized light beams from the polarized light split by the first prism, and for forming two sets of combined light in which one polarized light beam of said first group is combined with one polarized light beam of said second group.

12. A Stokes parameter measurement method, comprising the steps of:

splitting signal light to be measured into polarized light of a first direction and polarized light of a second direction, by means of a first splitting portion having a birefringent prism;

generating, by means of a second splitting portion having a plurality of birefringent prisms, a first group of polarized light beams corresponding to said first direction and a second group of polarized light beams corresponding to said second direction, by further splitting the polarized light split by said first splitting portion through two steps;

combining at least one polarized light beam of said first group with at least one polarized light beam of said second group, by a predetermined combination, by means of said second splitting portion;

adjusting, by means of a polarization adjustment portion, the polarization state of one or more among the combined light beams; and determining an optical intensity component, a 0° polarized component, a 45° polarized component and a circularly polarized component, serving as Stokes parameters, on the basis of an output of a light-receiving portion for performing photoelectric conversion of an optical component of the signal light split by and emitted from said second splitting portion and said polarization adjustment portion.

* * * * *